No. 890,209. PATENTED JUNE 9, 1908.
C. W. BAIRD.
HAY RAKE AND LOADER.
APPLICATION FILED MAY 21, 1907.
2 SHEETS—SHEET 1.
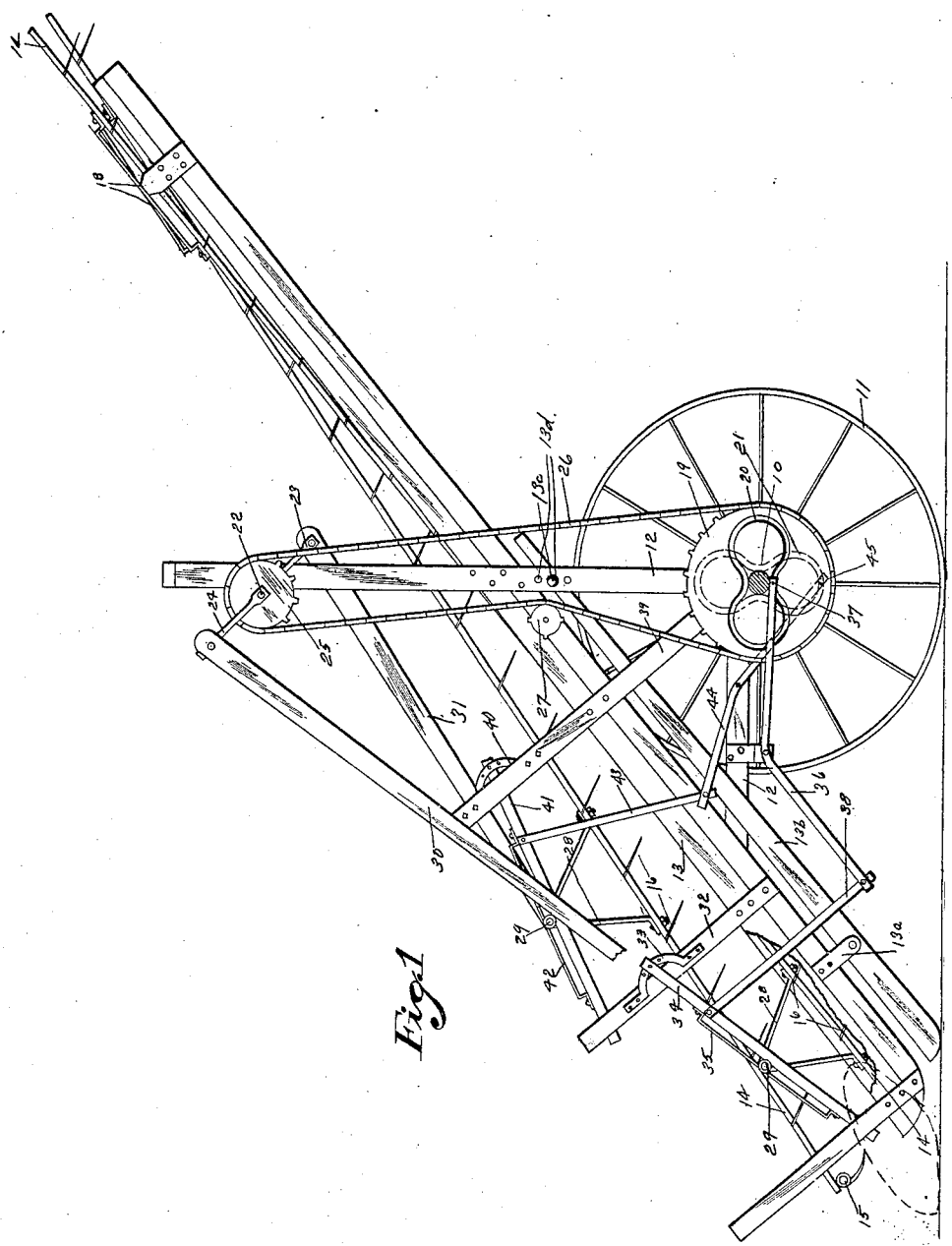

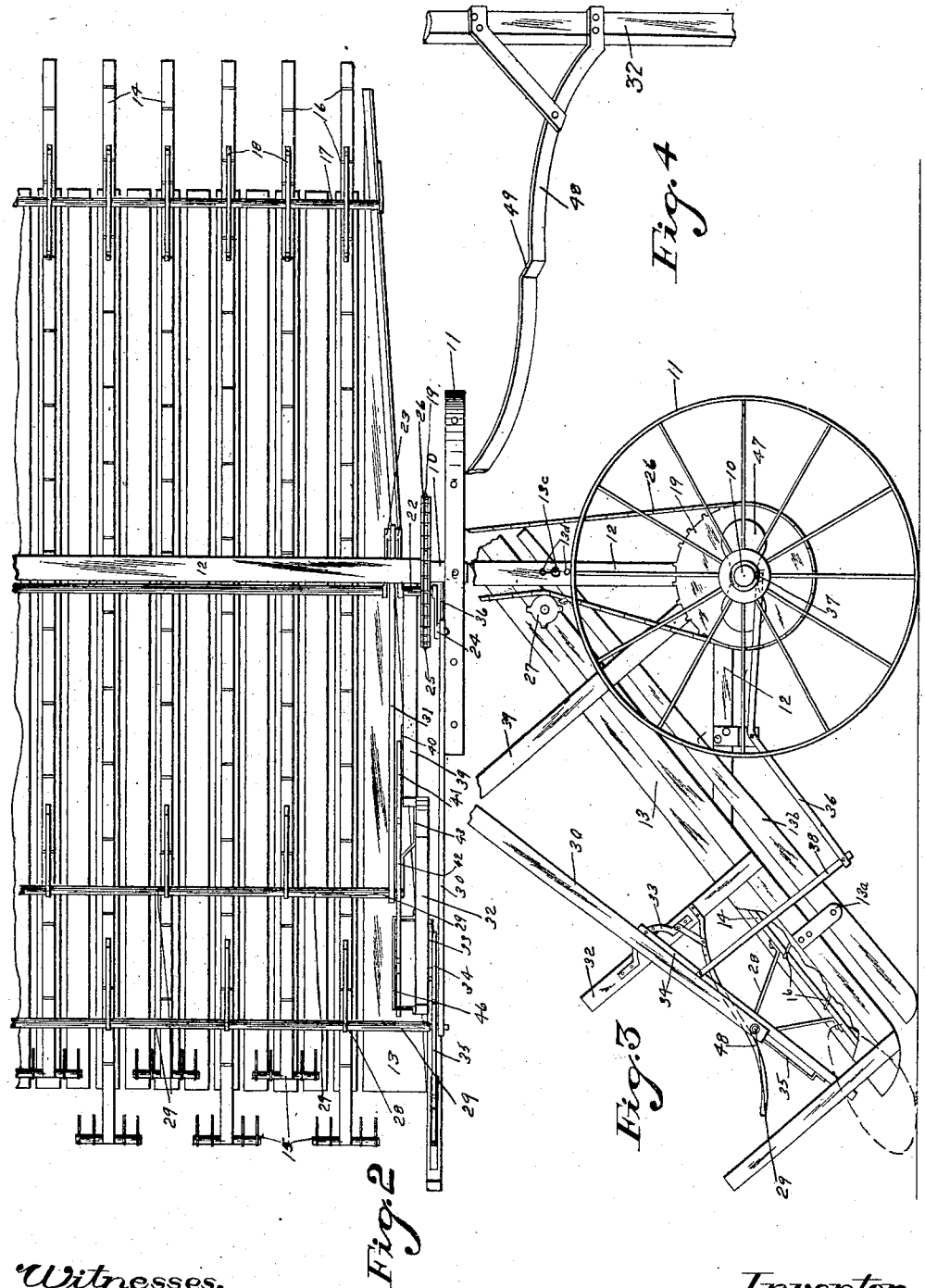

UNITED STATES PATENT OFFICE.

CHARLES W. BAIRD, OF DEEP RIVER, IOWA.

HAY RAKE AND LOADER.

No. 890,209.　　　　Specification of Letters Patent.　　　　Patented June 9, 1908.

Application filed May 21, 1907. Serial No. 374,974.

*To all whom it may concern:*

Be it known that I, CHARLES W. BAIRD, a citizen of the United States, residing at Deep River, in the county of Poweshiek and State of Iowa, have invented a certain new and useful Hay Rake and Loader, of which the following is a specification.

The object of my invention is to provide a hay rake and loader of simple, durable and inexpensive construction, designed to be operated by power from its supporting wheels and so arranged as to give to the rake teeth a comparatively long movement longitudinally of the loader frame, and to raise the teeth clear of the material at the upper end of the stroke, and hold them elevated during the rearward stroke, and permit them to move downwardly into engagement with the ground at the rearward limit of the stroke.

My invention consists of the construction, arrangement and combination of the various parts of the device whereby the objects contemplated are attained.

Figure 1 shows a side elevation of the complete hay rake embodying my invention. Fig. 2 shows a top or plan view of the complete hay rake embodying my invention, one side of same being broken away, Fig. 3 shows a side view of a part of a hay rake embodying my invention, showing a modified form of the means for guiding the rake bars, and Fig. 4 shows a detail perspective view of the guide bar used in the modification shown in Fig. 3.

Referring to the accompanying drawings, I have used the reference numeral 10 to indicate the main axle of the device. Fixed to the axle are the supporting wheels 11, and mounted upon the axle is a frame 12. Fixed to this frame is the body portion 13 of the hay rake and loader, which body portion is formed with slats at the bottom, and is of the kind now in general use. It is extended at an angle of approximately 45 degrees, its rear end being designed to rest on the ground, and its forward end to project over a wagon to which the device is attached.

Under different conditions of the work it is desirable to have the rear end of the frame supported at different distances above the ground. I have provided for accomplishing this desirable result as follows: Mounted on the lower end of the sides of the frame is a bracket $13^a$, to which a lever $13^b$, is pivoted. The lower end of the lever is designed to rest upon the ground to support the rear end of the frame and the upper end of the lever is provided with a detachable pin $13^c$, designed to be placed in any one of a row of openings $13^d$, formed in one of the uprights of the frame. Mounted above the frame 13 are two sets of rake bars 14, those in one set being arranged alternately of those in the other set. These rake bars are provided on their rear ends with the rake teeth 15, and each is also provided throughout its length with a series of hay elevator teeth 16, which project downwardly and forwardly. I provide for slidingly supporting the upper ends of the rake bars 14 as follows: The numeral 17 indicates a cross bar supported above the top of the frame, and fixed to each rake bar is a guide 18, which overlaps the cross bar 17.

The rear ends of the rake bars are supported and operated as follows: Fixed to the axle 10 is a sprocket wheel 19, having a cam groove 20 formed on its outer face and a cam groove 21 formed on its inner face. Mounted in the frame 12 above the central portion of the slatted frame 13, is a shaft 22, having two oppositely disposed crank arms 23 and 24, formed thereon. Fixed to this shaft is a sprocket wheel 25, connected by a chain 26 with the sprocket wheel 19. A chain tightener 27 is provided for this chain. Each set of the rake bars 14 is connected by means of the brackets 28, fixed to a cross bar 29. The cross bar of one set of the rake bars is connected by an arm 30 with the crank arm 24, and the cross bar of the other set is connected by an arm 31 with the crank arm 23. In this way the two sets of rake bars are alternately moved longitudinally of the slatted frame 13, when the machine is advanced. I have provided for giving the proper up and down motion to the rake bars as follows: Near the lower end of the frame 13 is an upright 32 having a grooved bracket 33 fixed thereto, and pivotally connected with this bracket 33 is a guide arm 34, extended downwardly and rearwardly, and having mounted thereon a guide bracket 35 overlapping the cross bar 29. The rear lower end of this frame 13 is free to move up and down and I have provided for so moving it at the proper times by means of a lever 36 fulcrumed to the frame 12, and having a roller 37 mounted thereon, and inserted in the cam groove 20. Pivoted to the rear end of the lever 36 is a link 38 extended upwardly and pivoted to the guide arm 34. The shape of this cam 20 is such as to cause the rear ends of the rake bars 14 to move in substantially the path indicated by dotted lines in Fig. 1. In this connection it is to be understood that the sprocket wheel 25 is made one-half the diameter of the sprocket wheel 19, so that the rear ends of the rake bars form two complete movements during each complete rotation of the cam 20. For operating the second set of rake bars 14, I have provided an upright 39, fixed to the frame 13 above the upright 32 and containing a bracket 40, to which a guide bar 41 is pivoted. This guide bar has a bracket 42 thereon to engage the cross bar 29. A link 43 is pivoted to the said guide bar, and a crank 44 is fulcrumed to the frame 13, and pivotally connected with the link 43. This is also provided with a roller 45, to enter the cam groove 21 on the inner side of the sprocket wheel 19. I have provided for holding both the bars 34 and 41 so that their rear ends will move only up and down, by means of the guide brackets 46, secured to the inner faces of the uprights 32 and 39, one of the uprights and its bracket 46 being clearly shown in Fig. 2. By means of the construction thus described, and assuming that the device is being advanced over a field, each set of rake bars will move rearwardly in substantially the path shown by dotted lines in Fig. 1. Then when at its rearward limit of movement, the rake bars will drop down into engagement with the ground, and will then move forwardly over the ground until they reach the slatted frame 13, whereupon they will move upwardly along the slatted frame until they reach the upward limit of their movement, then they will be elevated so that the teeth 16 will disengage from the hay on the slatted platform, and then the rearward movement will begin.

In Fig. 3 I have shown a modified form of mechanism for imparting substantially the same motion of the rake bars. Instead of the cam grooves 20 and 21, I have provided a cam 47 of substantially the same shape as said cam grooves, and the lever 36 is provided with a roller to rest against the working faces of the cam 47. Supported on the upright 32 is a stationary guide bar 48, having its rear end curved upwardly so that it will impart to the rake bars, during their rearwardly movement, a stroke corresponding to the shape of the top of the bar 48. This bar 48, is provided with a lateral bend at the point marked 49, and in use its function is as follows: The cam 47 will operate to raise the cross bar 29, at the forward portion of the stroke, and hold it in an elevated position during the rearward portion of the stroke. At the rear of the stroke the rake teeth will drop to the ground and the guide bar 48 will serve to hold the rake teeth in contact with the ground and also downwardly against the slatted frame during the upward movement of the rake teeth, then when the upward movement is completed, the cross bar 29 will pass the lateral bend 49 in the guide bar 48, and move upwardly above the guide bar. In Fig. 3 of the drawings, only one set of rake teeth and one guide bar are shown, it being understood that a similar guide bar is provided for each set of rake teeth.

In the foregoing description, I have set forth only the mechanism of one side of the frame. It is to be understood that the other side of the frame may be supplied with the same mechanism for operating the rake bars.

Having thus described my invention, what I claim and desire to secure by Letters Patent of the United States, therefor, is—

1. In a hay rake and loader, the combination of supporting wheels, a frame mounted thereon, a series of rake bars above the frame, a cross bar for connecting the rake bars, a guide arm capable of up and down movement, having said cross bar slidingly mounted thereon, a cam operatively connected with the supporting wheels, a lever operated by said cam and connected with said guide bar, and means for imparting a longitudinal movement to the rake bars.

2. In a hay rake and loader, the combination of a frame comprising longitudinal slats, supporting wheels for the frame, a sprocket wheel operated by the supporting wheels, a cam connected with the sprocket wheel, a crank shaft above the slats, means for operating the crank shaft from the said sprocket wheel, a series of rake bars above the slats, means operated by the said crank shaft for imparting a longitudinal movement to the rake bars, a guide arm pivotally supported at its forward end, a cross bar connecting the rake bars and mounted upon said guide arm, a lever operatively connected with said cam, and a link pivoted to the lever and to said guide bar.

3. In a hay rake and loader, the combination of a frame, slats carried by the frame, an axle for supporting the frame, ground wheels on the axle, two sets of alternately arranged rake bars, rake teeth at their ends, and elevating teeth throughout their body portions, two cross bars, each connected with all of the rake bars of one set, means for slidingly supporting the upper ends of the rake bars above the slats, a sprocket wheel fixed to the axle and having a cam groove in each side, a crank shaft mounted above the rake bars, and having two oppositely disposed crank bars thereon, a sprocket wheel connected with said crank shaft, a chain for connecting said sprocket wheels, an arm on each of said crank arms, connected with one of said cross bars, a guide arm for each cross bar adjustably pivoted at its forward end, and extended downwardly and rearwardly, two levers, each having a roller, one roller entering the cam groove on the outer face of the sprocket, and the other the cam groove on the inner face thereof, and a link connecting each lever with the corresponding guide bar that supports the cross bar of the rake bars.

Des Moines, Ia., 3—22—07.

CHARLES W. BAIRD.

Witnesses:
 B. MONTROSS,
 RAY VAN.